United States Patent
Wildfeuer et al.

(10) Patent No.: US 7,746,881 B2
(45) Date of Patent: *Jun. 29, 2010

(54) MECHANISM FOR MODEM PASS-THROUGH WITH NON-SYNCHRONIZED GATEWAY CLOCKS

(75) Inventors: Hebert M. Wildfeuer, Santa Barbara, CA (US); Nicholas J. Cutaia, Brighton, MA (US); Michael E. Tasker, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 1137 days.

This patent is subject to a terminal disclaimer.

(21) Appl. No.: 11/004,352

(22) Filed: Dec. 3, 2004

(65) Prior Publication Data

US 2005/0088975 A1 Apr. 28, 2005

Related U.S. Application Data (63) Continuation of application No. 09/734,375, filed on Dec. 11, 2000, now Pat. No. 6,829,244.

(51) Int. Cl.
*H04L 12/54* (2006.01)
*H04L 12/56* (2006.01)
*H04J 3/06* (2006.01)

(52) U.S. Cl. ............. 370/412; 370/428; 370/503; 375/354

(58) Field of Classification Search .......... None
See application file for complete search history.

(56) References Cited

U.S. PATENT DOCUMENTS

| | | | |
|---|---|---|---|
| 4,692,894 A | 9/1987 | Bemis | |
| 4,716,575 A | 12/1987 | Douros et al. | |
| 5,172,396 A | 12/1992 | Rose et al. | |
| 5,226,012 A | 7/1993 | Amano et al. | |
| 5,297,139 A | 3/1994 | Okura et al. | |
| 5,450,410 A * | 9/1995 | Hluchyj et al. | 370/394 |
| 5,541,926 A | 7/1996 | Saito et al. | |
| 5,640,388 A * | 6/1997 | Woodhead et al. | 370/468 |
| 5,668,841 A * | 9/1997 | Haskell et al. | 375/371 |
| 5,802,119 A | 9/1998 | Jung et al. | |
| 5,844,891 A | 12/1998 | Cox | |
| 5,867,663 A * | 2/1999 | McClure et al. | 709/234 |
| 6,044,092 A * | 3/2000 | Jayawardena et al. | 370/516 |
| 6,154,796 A | 11/2000 | Kuo et al. | |

(Continued)

OTHER PUBLICATIONS

Pines, System and Method for measuring sample arrival rates on an asynchronous transport network, U.S. Appl. No. 60/229,367, filed Aug. 2000.

*Primary Examiner*—Gregory B Sefcheck
(74) *Attorney, Agent, or Firm*—Hamilton, Brook, Smith & Reynolds, P.C.

(57) ABSTRACT

A method for compensating for asynchronous clock sources is presented. A buffer is provided for storing frames received from a packet network. The buffer having a preselected playout delay. Upon detecting a buffer overflow, a drain operation is performed on the buffer and the playout delay is modified to provide a sufficient number of buffer locations for frames to be stored. Upon detecting a buffer underflow, a fill operation is performed on the buffer and the playout delay is modified to provide a sufficient number of frames to be played out.

26 Claims, 7 Drawing Sheets

U.S. PATENT DOCUMENTS

| | | |
|---|---|---|
| 6,266,385 B1 | 7/2001 | Roy et al. |
| 6,292,490 B1 * | 9/2001 | Gratacap et al. ............ 370/412 |
| 6,351,508 B1 * | 2/2002 | Shishkoff et al. ........... 375/375 |
| 6,359,883 B1 | 3/2002 | Lechleider |
| 6,621,792 B1 * | 9/2003 | Petty ....................... 370/230.1 |
| 6,665,298 B1 * | 12/2003 | Kirzner et al. ........... 370/395.1 |
| 6,724,847 B1 * | 4/2004 | Kallman et al. ............. 375/355 |
| 7,170,856 B1 * | 1/2007 | Ho et al. ..................... 370/230 |
| 2002/0078225 A1 | 6/2002 | Pines |
| 2003/0179757 A1 | 9/2003 | Ten Kate et al. |

\* cited by examiner

MECHANISM FOR MODEM PASS-THROUGH WITH NON-SYNCHRONIZED GATEWAY CLOCKS

RELATED APPLICATION

This application is a continuation of U.S. application Ser. No. 09/734,375, filed Dec. 11, 2000, now U.S. Pat. No. 6,829,244. The entire teachings of the above application are incorporated herein by reference.

BACKGROUND OF THE INVENTION

A modem pass-through can be used to provide a modem connection for transporting modem data between a calling modem and an answering modem over a packet network. The modem pass-through emulates a PSTN network when transporting a G.711 Pulse Code Modulation ("PCM") stream over the packet network. To emulate a PSTN network the modem pass-through provides the modem connection between the calling modem and the answering modem similar to the modem connection provided by the PSTN network.

The packet network can implement any well-known packet network protocol, such as, the Asynchronous Transfer Method ("ATM"), Frame Relay protocol ("FR") or Internet Protocol ("IP"). The modem pass-through forwards the G.711 PCM stream using protocols developed for transmitting real-time audio over a packet network. One standard protocol for packetizing real-time audio for transporting Voice over IP ("VoIP") is the Real-Time Transport Protocol ("RTP") (Request for Comments ("RFC") 1889, January 1996) available on the Internet Engineering Task Force ("IETF") web site.

To transport VoIP, a packet transmitter in an originating packet network node encodes the analog voice signal received from the PSTN, stores the encoded data in the payload of one or more data packets and transmits the data packet over the packet network. Each data packet includes a destination address stored in a header included in the data packet.

Before the modem connection is provided, the calling modem and the answering modem must perform modem training. Modem training includes negotiating communication parameters such as, data transfer rate, data compression, error correction protocol and modulation. Modem training includes a series of training steps, in which the calling modem and the answering modem adjust to each other's characteristics and to the characteristics of the switched connection. These training steps include V.8/V.8bis, auto-mode, error correction and data compression. The steps and procedures are defined by the ITU V. series of modem specification and other modem specifications including MNP5 compression. ITU V. series modem specifications include V.8, V8bis, V.42, V.42bis, V.34, V.90, V.92, and V.32/V.32bis.

Once modem training is complete, the modem connection is provided by the modem pass-through between the calling modem and the answering modem. However, data can only be transported between the modems while the modem connection is provided by the modem pass-through.

Unlike a telephone network in which there is a dedicated connection between the calling modem and the answering modem, each data packet transmitted from a modem may travel on a different path from a source packet network gateway to a destination packet network gateway connected to the packet network. Some data packets may travel faster than others. Thus, data packets transmitted over the packet network may arrive out of order at the destination packet network gateway.

To compensate for these path differences, each packet network gateway includes a jitter buffer. The jitter buffer temporarily stores PCM data extracted from the payload of data packets received from the packet network. The PCM data is forwarded in-order after a playout delay to the modem. Temporarily storing received PCM data in a jitter buffer allows a smooth ordered playout of the extracted PCM data to the modem.

Each packet network gateway includes a separate clock source. The clock sources are not synchronized. The remote clock source determines the rate at which data packets are received by the local packet network gateway from the remote packet network gateway over the packet network. The local clock source determines the rate at which the packet network gateway reads the extracted PCM data from the jitter buffer. Thus, timing differences accumulate at both the local packet network gateway and the remote packet network gateway because the local clock source and the remote clock source are not synchronized. These timing differences result in a progressive accumulation of PCM data stored in the jitter buffer at one packet network gateway and a progressive depletion of PCM data stored in another jitter buffer at another packet network gateway. Eventually, the jitter buffer in a packet network gateway with either underflow or overflow. During these overflow/underflow periods, the jitter buffer provides incorrect data resulting in modem speed shifts and/or modem retrains. Modem retrains reduce data throughput through the packet network because no data packets are transmitted during the modem retrain.

In order to avoid modem retrains, a packet network gateway computes a playout delay time for its respective jitter buffer. Adaptive delay adjustment is implemented by continuously monitoring the playout delay time and periodically readjusting the playout delay in order to compensate for the difference between the local clock source and the remote clock source. However, even with adaptive delay adjustment to continuously adapt the playout delay, a clock slip is unavoidable resulting in modem retrains and/or speed shifts. These modem retrains and/or modem speed shifts result in decreased throughput on the modem connection and the inability to emulate a PSTN network over a packet network for modem transfer rates required by fast modems, such as V.90.

SUMMARY OF THE INVENTION

We present a method for reducing the frequency of modem retrains in a modem pass-through by compensating for asynchronous clocks. A buffer having a preselected playout delay, is provided for storing frames received from a packet network. Upon detecting a buffer overflow, a drain operation is performed on the buffer and the playout delay is modified to provide a sufficient number of buffer locations for frames to be stored.

Upon detecting a buffer underflow, a fill operation is performed on the buffer and the playout delay is modified to provide a sufficient number of frames to be played out.

A buffer underflow or buffer overflow may be triggered upon detecting a reset message received from the packet network dependent on the number of frames stored in the buffer. The data stored in the buffer may be modem data or fax data.

A resampling buffer may be provided for storing data forwarded from the buffer. An estimated clock difference between the asynchronous clock sources is monitored and a clock slip operation is performed in the resampling buffer dependent on the estimated clock difference. If the estimated clock difference is a frame slip forward, the clock slip operation decimates the frame stored in the resampling buffer at a clock rate dependent on the estimated clock difference. If the estimated clock difference is a frame slip backward and the clock slip operation forwards a frame stored in the resampling buffer which has been interpolated at a clock rate dependent on the estimated clock difference.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
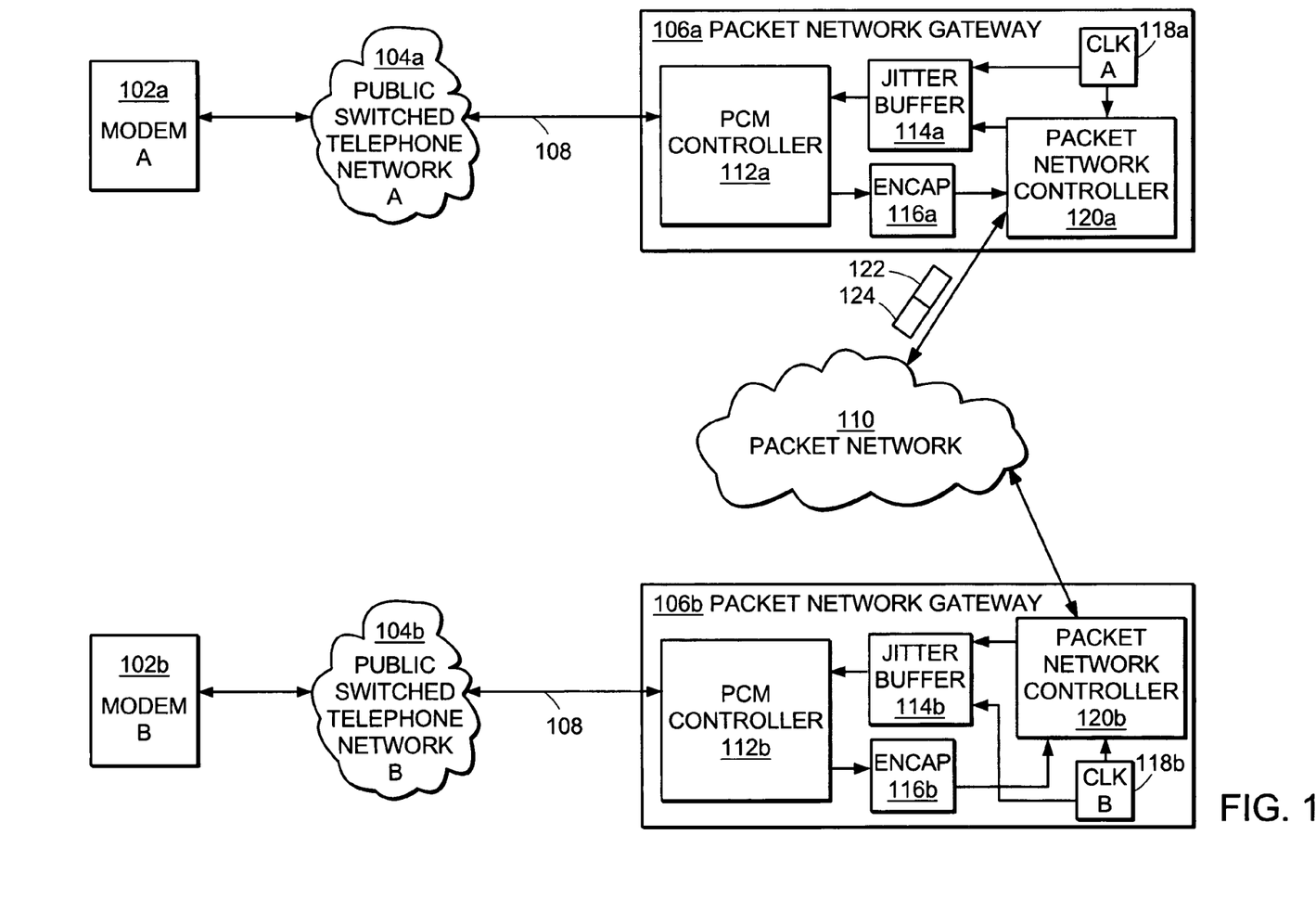
FIG. 1 illustrates a packet network gateway implementing modem pass-through to forward a stream of PCM data between a calling modem and an answering modem over a packet network according to the principles of the present invention.

FIG. 1 illustrates a packet network gateway 106a, 106b implementing modem pass-through to forward a stream of PCM data 108 between a calling modem 102a and an answering modem 102b over a packet network 110 according to the principles of the present invention. The calling modem 102a can be a client modem. The answering modem 102a can be a Remote Access Server ("RAS") or a client modem. Data originating in calling modem 102a is forwarded to answering modem 102b through Public or Private Switched Telephone Networks ("PSTN") 104a, 104b, packet network gateways 106a, 106b and the packet network 110. A stream of PCM data 108 is transmitted over the PSTN 104a. Before forwarding the stream of PCM data 108 over the packet network 110, the packet network gateway 106a, 106b portions the stream of PCM data 108 into frames and stores one or more frames in the payload 124 of a data packet 122. The data packet 122 including the PCM data is transmitted over the packet network 110. The stream of PCM data 108 received by any one of the packet network gateways 106a, 106b is packetized by the packet network gateway 106a, 106b according to the packet network protocol implemented in the packet network 110. The packet network protocol can be the Asynchronous Transfer Method ("ATM"), Frame Relay protocol ("FR") or Internet Protocol ("IP").

Each packet network gateway includes a PCM controller 112a, 112b for receiving and transmitting the stream of PCM data 108 on the respective PSTN 104a, 104b and a packet network controller 120a, 120b for receiving and transmitting data packets 122 on the packet network 110. The PCM controller 112a, 112b is described later in conjunction with FIG. 2. The packet network controller 120a, 120b is dependent on the packet network protocol implemented by the packet network 110.

A PCM data stream 108 originating in calling modem 102a is transmitted on the Public Switched Telephone Network ("PSTN") 104a to packet network gateway 106a. Packet network gateway 106a includes a PCM controller 112a, a jitter buffer 114a, an encapsulator 116a, a packet network controller 120a and a clock source 118a. The stream of PCM data 108 from the PSTN 104a is received by the PCM controller 112a. The PCM controller 112a forwards the received stream of PCM data 108 to the encapsulator 116a. The encapsulator 116a encapsulates the stream of PCM data 108. The encapsulated PCM data is forwarded to the packet network controller 120a. The packet network controller 120a packetizes the encapsulated PCM data by portioning the encapsulated PCM data into frames and storing one or more frames in the payload 124 of a data packet 122.

As data packets 122 are received by the packet network controller 120a, 120b from the packet network 110, the PCM data stored in the payload 124 of the data packet 122 is extracted from the data packet 122 and stored in the jitter buffer 114a, 114b. The jitter buffer 114a, 114b also reorders the received data to provide in-order delivery of the received data to the respective modem 102a, 102b. The PCM data is read from the jitter buffer 114a, 114b after a predetermined playout delay dependent on the frequency of a clock source 118a, 118b provided in each packet network gateway 106a, 106b. The respective clock source 118a, 118b determines the rate at which the respective jitter buffer 114a, 114b is read and the rate at which data packets are transmitted from the respective packet network gateway 106a, 106b to the packet network 110. Playout starts after a predetermined playout delay after the jitter buffer 114a, 114b receives the data. The predetermined playout delay ranges from 40 milliseconds ("ms") to 120 ms for a 250 ms jitter buffer.

The clock source 118a in packet network gateway 106a is not synchronized with the clock source 118b in packet network gateway 106b. The allowed variation in frequency for each clock source is specified by American National Standard Institute ("ANSI") T1.101-1987 in parts per million ("ppm"). The allowed variation is dependent on the stratum level at which the packet network gateway 106a, 106b operates. For example, the allowed variation is $1 \times 10^{-11}$ ppm at stratum level 1 and $32 \times 10^{-6}$ ppm at stratum level 4. Due to the variation in frequency between clock sources 118a and 118b, packet network gateway 106a can transmit data packets to packet network gateway 106b faster or slower than packet network gateway 106b can read the received PCM data stored in the jitter buffer 114b.

The difference in clock frequency between clock sources 118a and 118b can result in an overflow or underflow in the respective jitter buffer 114a, 114b. An underflow occurs when data is being read from the jitter buffer 114a, 114b faster than it is being written. An underflow is detected when the PCM controller 112a, 112b reads from a location in the jitter buffer 114a, 114b in which data has not yet been written. An overflow is detected when the packet network controller 120a, 120b attempts to write to a location in the jitter buffer 114a, 114b which has not yet been read.

Figure 2:
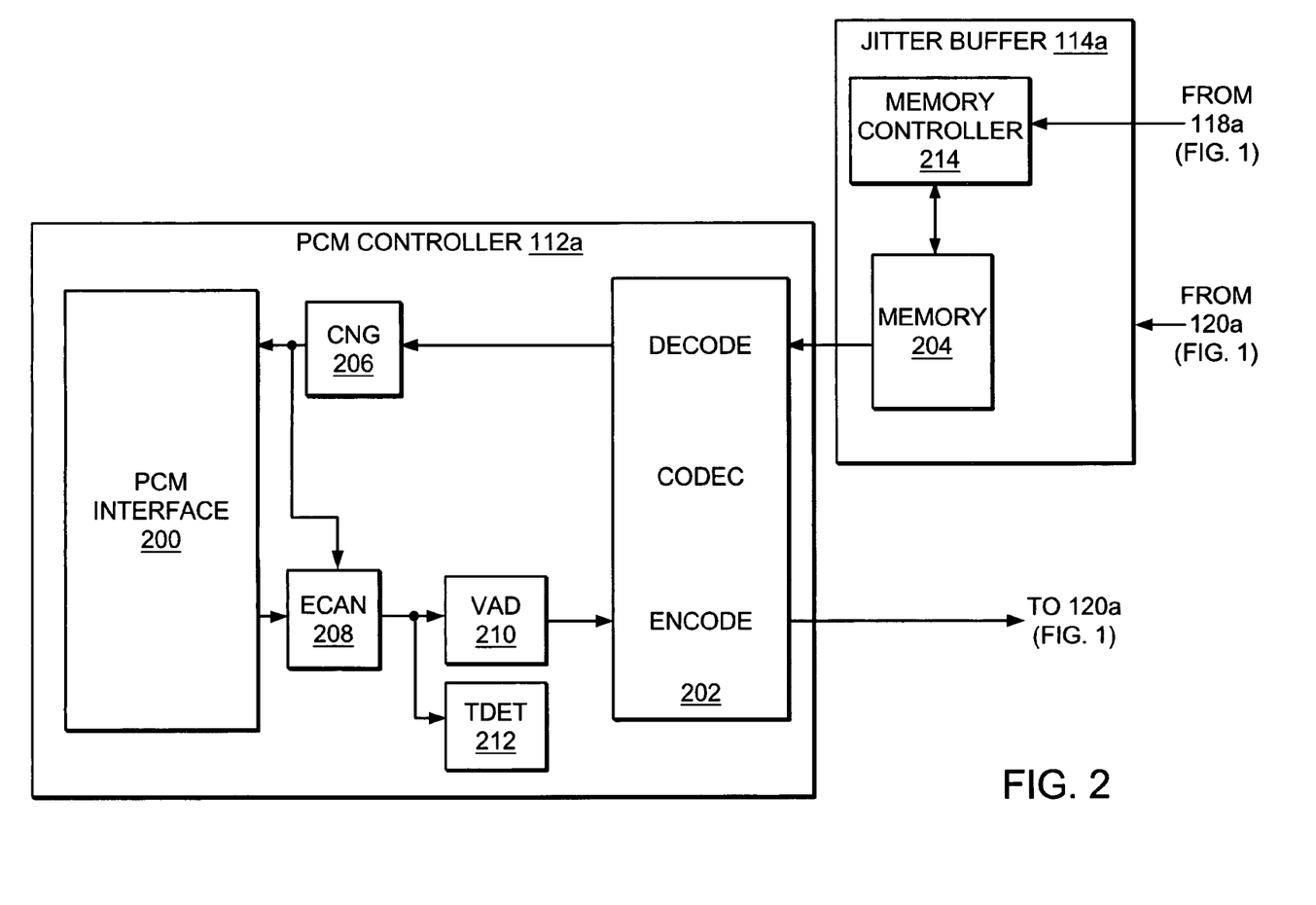
FIG. 2 illustrates the PCM controller and jitter buffer included in any one of the packet network gateways shown in FIG. 1.

FIG. 2 illustrates the PCM controller 112a and jitter buffer 114a which can be included in any one of the packet network gateways 106a, 106b shown in FIG. 1. The PCM controller 112a includes a PCM interface 200, a CODEC 202, a "Comfort Noise Generator ("CNG") 206, a Voice Activity Detector ("VAD") 210, an Echo Canceller ("ECAN") 208 and a Tone Detector ("TDET") 212. The jitter buffer 114a includes a memory 204 and a memory controller 214.

The PCM controller 112a can operate in modem mode, voice mode or fax mode. The PCM controller 112a switches to modem or fax mode upon detecting modem or fax signals and switches to voice mode upon detecting non-modem/fax signals, such as speech or silence. The modem/fax detection occurs in the PCM interface 200. Thus, the PCM controller 112a switches operating mode dependent on the type of signal detected. Modem answer back tone is detected by the TDET 212. Fax tones are also detected by the TDET 212. ECAN 208 is enabled to provide echo cancellation when the PCM controller 112a is operating in voice mode and disabled when the PCM controller 112a is operating in modem mode or fax mode.

The memory controller 214 in the jitter buffer 114a controls the playout delay for the memory 204. Playout delay is the period of time that PCM data 108 received from the packet network 110 is stored in the memory 204 before being forwarded through the PCM controller 112a to the PSTN 104a. Thus, the playout delay is the delay after which the received PCM data 108 is forwarded to the respective modem 102a, 102b (FIG. 1).

To set up a modem connection between the calling modem 102a (FIG. 1) and the answering modem 102b (FIG. 1), the calling modem 102a sets up a call using a voice compression standard such as, G.729(a), G.729(b), G.711, G.726, G.723.1, G.729 or any other voice compression standard. This call is like a voice call. In response to the request to set up a call, the answering modem 102b returns a modem signal commonly referred to as an answer back tone to the calling modem 102a. Answer back tone is detected by the TDET 212. Upon the detection of answer back tone by the TDET 212, the PCM controller 112a changes to modem mode.

In modem mode, the PCM controller 112a implements the G.711 protocol. The PCM controller 112a disables the VAD 210 and the ECAN 208. The memory controller 214 in the jitter buffer 114a controls the playout delay of the memory 204.

Figure 3:
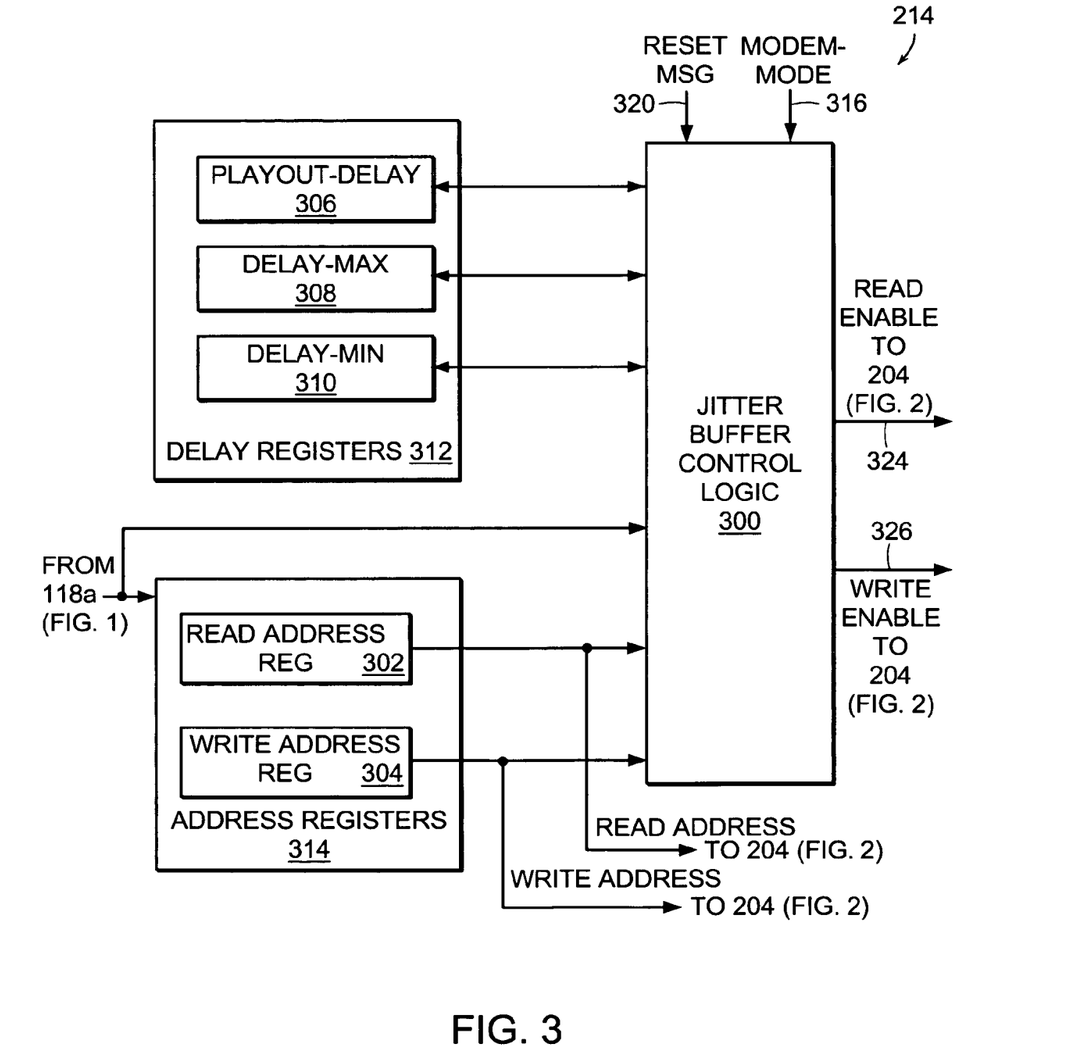
FIG. 3 illustrates the jitter buffer control logic, delay registers and address registers included in the memory controller shown in FIG. 2.

FIG. 3 illustrates the jitter buffer control logic 300, delay registers 312 and address registers 314 included in the memory controller 214 shown in FIG. 2. Playout delay is necessary because of the jitter on data packet arrivals from the packet network 110 (FIG. 1). The playout delay determines the time at which the received data is played out, for example, if a data packet arrives at the jitter buffer 114a, 114b at time (t), the data packet is played out at (t+playout−delay). The delay registers 302 include a playout delay register 306, a delay-max register 308 and a delay-min register 310. The delay-max register 308 stores the maximum time that the memory controller 214 can wait before playing out (reading) the data after it is received. The delay-min register 310 stores the minimum time that the memory controller 214 can wait before playing out (reading) the data after it is received. The playout delay register 306 stores the current playout delay selected by the jitter buffer control logic 300.

The detection of modem answer back tone by the TDET 212 indicates a switch to modem mode is required. The playout delay is selected prior to modem training after the modem tone is detected. Modem training is performed before data transfer is enabled. The playout mode is set to fixed (not adaptive) with timestamps. Initially, after the detection of modem answer back tone, the playout delay register 306 stores the last playout delay selected. The delay_min register 310 is set to the value stored in the playout delay register 306 and the delay_max register 308 is set to the maximum possible extent of the memory 204 (FIG. 2). Setting the minimum playout delay to the value of the most recent playout delay value ensures that the minimum playout delay value does not fall below the most recent playout delay prior to modem answer back tone detection.

Data is written to the memory 204 at the write address stored in the write address register 304 in the address registers 314 as data packets are received by the packet network controller 120a. The rate at which data packets arrive is dependent on the frequency of the remote clock source 118b. After the playout delay, data stored in memory 204 is played out (read from the memory 204) at a constant rate dependent on the local clock source 118a. The data is read from memory 204 dependent on the read address stored in the read address register 302 in the address registers 314. Each data packet 122 transmitted over the packet network 110 may travel on a different path. Thus, there may be jitter due to bursts of data packets 122 interspersed with periods in which data packets 122 are not received. At some point, dependent on whether the read is faster or slower than the write, the memory 204 (FIG. 2) will either overflow or underflow.

Overflow is detected if a write is attempted when the memory 204 (FIG. 2) is full. The memory 204 (FIG. 2) is full if the write address stored in the write address register 304 equals the read address stored in the read address register 302. Upon detecting the overflow condition, the jitter buffer control logic 300 drains memory 204 by enabling the reading of the memory 204 through read enable 324 and disabling the writing of memory 204 through write enable 326 until the memory 204 is empty. While writing to memory 204 is disabled, data packets received from the packet network 110 are dropped. The dropped packets may result in a modem retrain and/or modem speed shifting. After memory 204 is filled, the jitter buffer control logic 300 sets the playout delay register 306 to the value stored in the playout delay-min register 310. Setting the playout delay to the value stored in the delay-min register 310, increases the time between overflows and thus, decreases the number of modem retrains. The memory 204 is drained in order to provide storage for a sufficient number of data frames before triggering another drain event.

Underflow is detected if a read is attempted when the memory 204 is empty. The memory 204 (FIG. 2) is empty when the write address stored in the write address register 304 and the read address stored in the read address register 302 are maximally separated (wrap around condition). Upon detecting the underflow condition, the jitter buffer control logic 300 fills memory 204 by enabling the writing of the memory through write enable 326 and disabling the reading of memory through read enable 324 until the memory 204 is full. While reading from memory 204 is disabled, no data is forwarded to the modem 102a. This may result in a modem retrain and/or modem speed shifting. After the memory 204 is filled, the jitter buffer control logic 300 sets the playout delay register 306 to the value stored in the playout delay-max register 308. Setting the playout delay to the value stored in the delay-max register 308, increases the time between underflows and thus, decreases the number of modem retrains. The memory 204 is filled in order to provide a sufficient number of data frames to be played out before triggering another fill event.

The jitter buffer control logic 300 also fills or drains the memory 204 upon detection of a reset message 320. A reset message 320 is transmitted by the remote packet network gateway 106b to notify the local packet network gateway 106a that the remote packet network gateway 106b has detected an overflow or an underflow state in its respective memory 204 and is in the process of performing a drain or a fill operation on its respective memory 204. The jitter buffer control logic 300 in the local packet network gateway 106a receives the reset message 320 and determines if its respective memory 204 is close to an overflow or underflow. If so, the jitter buffer control logic 300 in the local packet network gateway 106a performs a drain or a fill operation on its respective memory 204 at the same time as the remote packet network gateway 106b is performing a drain or fill operation on its respective memory 204. Synchronizing the time at which a drain or fill operation is performed in both packet network gateways 106a, 106b, halves the number of modem retrains.

Figure 4:
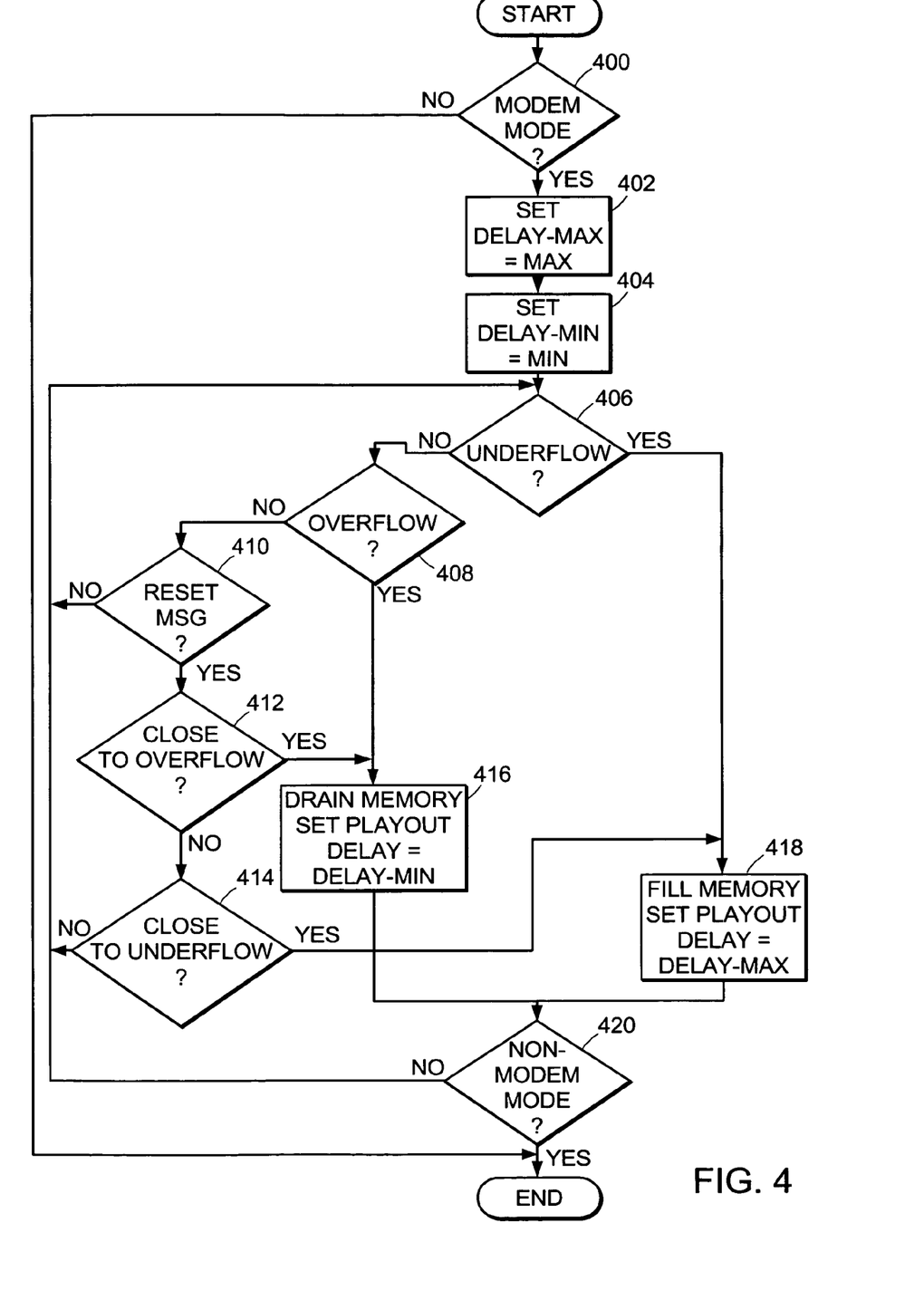
FIG. 4 is a flow chart illustrating a method for selecting the playout delay in the jitter buffer control logic shown in FIG. 3.

FIG. 4 is a flow chart illustrating a method for selecting the playout delay implemented in the jitter buffer control logic 300 shown in FIG. 3. FIG. 4 is described in conjunction with FIG. 2 and FIG. 3.

At step 400, the jitter buffer control logic 300 determines whether a switch to modem mode was detected. A switch to modem mode is detected by the TDET 212 (FIG. 2) in the PCM controller 112a by detecting answer back tone. A tone_detect message is sent to the jitter buffer control logic 300 indicating detection of answer back tone. If the jitter buffer control logic 300 receives the tone_detect message processing continues with step 402. If not, processing is complete.

At step 402, the jitter buffer control logic 300 sets the delay-max register 308 to the value of the maximum playout delay. The maximum playout delay is dependent on the extent of the memory 204. For example, if the maximum extent of memory is 250 ms, the maximum possible delay is 250 ms. However, in general the maximum possible delay is set to half of the maximum extent of memory (120 ms). By setting the maximum possible delay to half the maximum extent of memory allows the most room possible in the jitter buffer (half on each side) for performing a drain or fill. Processing continues with step 404.

At step 404, the jitter buffer control logic 300 sets the delay_min register 310 to the value of the most recent playout delay stored in the playout delay register 306. This ensures that the minimum playout delay does not fall below the most recent playout delay prior to the modem answer back tone detection. Processing continues with step 406.

At step 406, the jitter buffer control logic 300 determines if there is a memory underflow condition by examining the contents of the read address register 302 and the write address register 304. If so, processing continues with step 418. If not, processing continues with step 408.

At step 408, the jitter buffer control logic 300 determines if there is a memory overflow condition by examining the contents of the read address register 302 and the write address register 304. If so, processing continues with step 412. If not, processing continues with step 410.

At step 410, the jitter buffer control logic 300 determines if a reset message was received from the remote packet network gateway 106b indicating that the remote packet network gateway 106b has detected an overflow or underflow condition. If a reset message was received, processing continues with step 416. If not, processing continues with step 406.

At step 412, the jitter buffer control logic 300 determines if the memory 204 is close to overflowing by comparing the contents of the read address register 302 and the write address register 304. If so, processing continues with step 416. If not, processing continues with step 414.

At step 414, the jitter buffer control logic 300 determines if the memory 204 is close to underflowing by comparing the contents of the read address register 302 and the write address register 304. If so, processing continues with step 418. If not, processing continues with step 406.

At step 416, an overflow has been detected by the jitter buffer control logic 300 through a comparison of the contents of the read address register 302 and the write address register 304 or a close to overflow condition has been detected after receiving a reset message from the remote packet network gateway 106b. The memory 204 is drained by disabling writes to the memory 204 through write enable 326 and enabling reads from memory 204 through read enable 324.

Upon detecting that the memory 204 is empty, the jitter buffer control logic 300 sets the value of the playout delay register 306 equal to the value of the delay-min register 310. The jitter buffer control logic 300 enables writing to the memory 204 through write enable 326 and enables reading from the memory 204 dependent on the playout delay stored in the playout-delay register 306. The jitter buffer control logic 300 stores the arrival time of a data packet with the data packet in the memory 204 and allows the data packet to be read dependent on the playout delay stored in the playout-delay register 306. Processing continues with step 420.

At step 418, an underflow has been detected by the jitter buffer control logic 300 through a comparison of the contents of the read address register 302 and the write address register 304 or the detection of a close to underflow state after receiving a reset message from the remote packet network gateway 106b. The memory 204 is filled by disabling reads from the memory 204 through read enable 324 and enabling writes to memory 204 through write enable 326. By monitoring the write address stored in the read address register 302, the jitter buffer control logic 300 disables reads until the memory 204 is filled.

Upon detecting that the memory 204 is full, the jitter buffer control logic 300 sets the value of the playout delay register 306 equal to the value of the delay-max register 308. The jitter buffer control logic 300 enables reading from the memory 204 through read enable 324 dependent on the playout delay stored in the playout-delay register 306. Processing continues with step 420.

At step 420, the jitter buffer control logic 300 determines if the packet network gateway 106a has switched to non-modem mode. If so, processing is complete. If not, processing continues with step 406.

Figure 5:
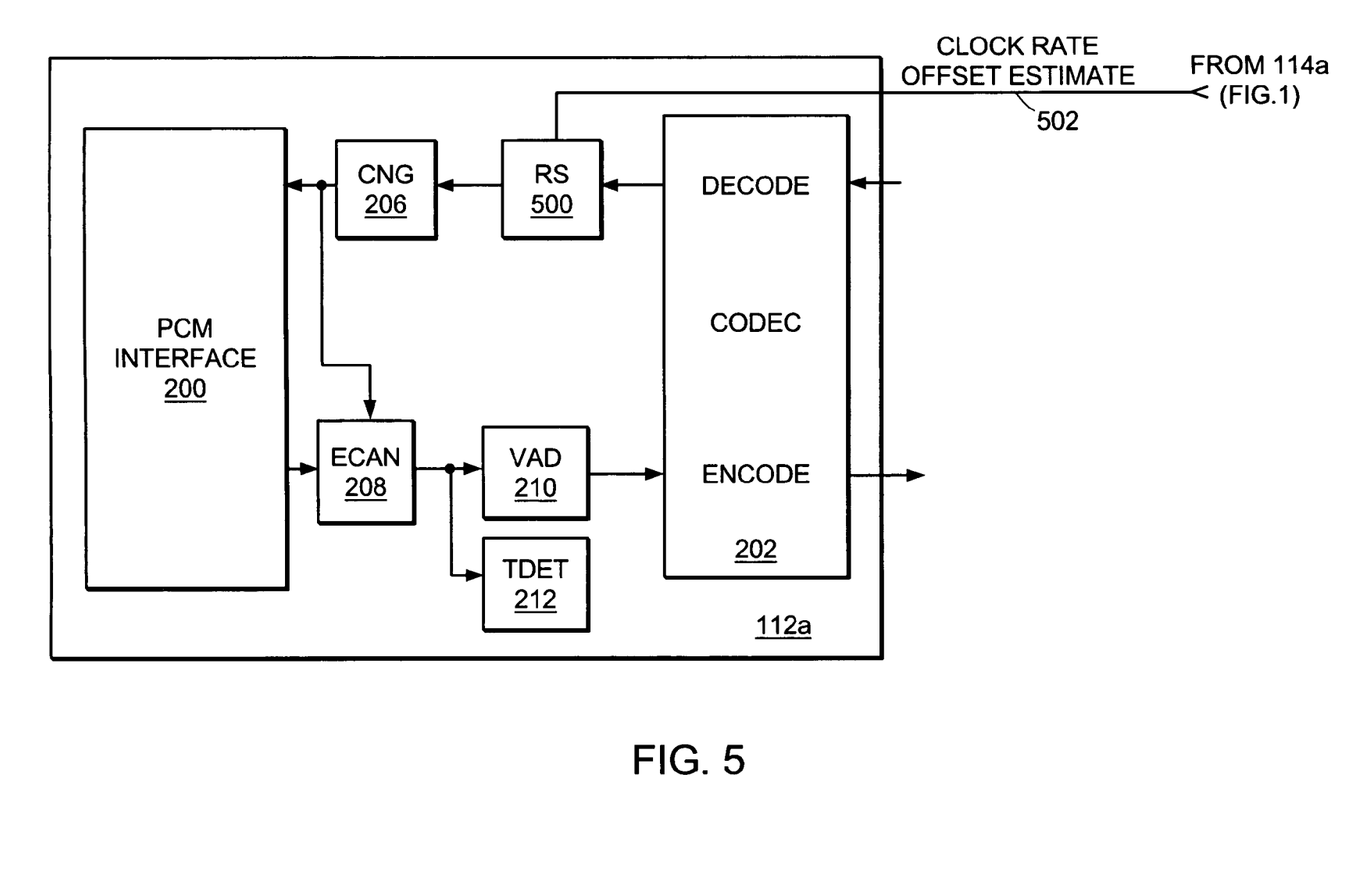
FIG. 5 illustrates an alternate embodiment of the PCM controller shown in FIG. 2 including a continuous phase resampling mechanism.

FIG. 5 illustrates an alternative embodiment of the PCM controller 112a shown in FIG. 2 including a continuous phase resampling mechanism ("RS") 216. The RS 500 further reduces the number of modem retrains. The RS 500 performs sample-level clock adjustments to compensate for clock differences between the clock sources 118a, 118b.

A decoded received frame from the CODEC 202 is forwarded to the RS 500 together with a clock rate offset estimate 502. The jitter buffer control logic 300 calculates the clock rate offset estimate 502. A resample slip variable is provided to indicate the type of sample-level clock adjustment to perform. The sample-level clock adjustment may be to add an interpolated sample, delete a sample or do nothing to the resampling buffer.

The jitter buffer control logic 300 monitors the playout delay during playout of the jitter buffer 114a, 114b. When the playout delay is estimated such that the position of the read address stored in the read address register 302 will cause a frame slip in either the forward or backward direction, the playout delay is not adjusted for the frame slip. Instead, the frame is forwarded to the RS 500 and the RS 500 handles the frame slip by spreading the frame slip over a maximum time duration. The detected frame slip can be selected to be the minimum size frame length (5 ms).

If a frame slip is needed to eliminate a frame, the frame to be eliminated is stored in the RS 500 instead of being forwarded to the PCM interface 200. A sample from the frame is discarded at a constant rate during subsequent frame playout until the stored frame is depleted. If a frame slip is needed to add a frame, the RS 500 sends a frame of interpolated data stored in the RS 500 to the PCM interface 200 when a mute frame is detected in the jitter buffer 114a. This stored frame is interpolated data collected by the RS 500 by interpolating data with a two-tap filter at a specified rate. The use of a two-tap filter is well-known to those skilled in the art. It involves getting the average by taking the sample at time t+1, the sample at t−1, adding them together and dividing by 2 to get the interpolated sample at time t.

Figure 6A:
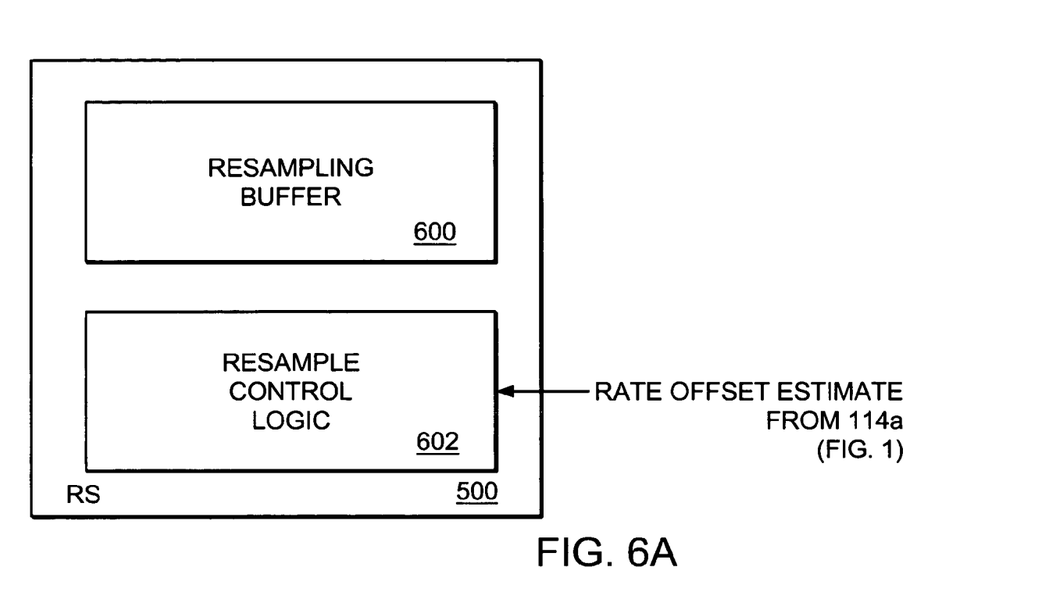
FIG. 6A-B illustrate the continuous phase resampling mechanism shown in FIG. 5 and associated resampling registers used by the continuous resampling mechanism.
Figure 6B:
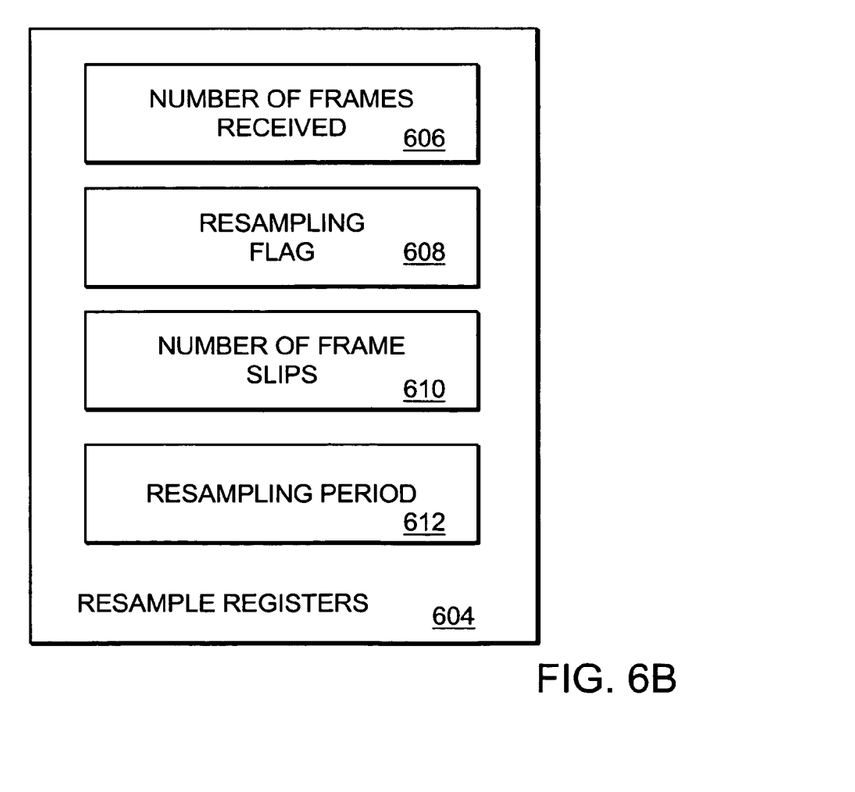

FIG. 6 illustrates the RS 500 shown in FIG. 5 and associated resampling registers 604 used by the RS 500. The RS 500 includes a resampling buffer 600 for storing frames and resample control logic 602. The resampling buffer 600 can store at least two frames. The resample registers 604 include registers for storing the number of frames received 606, resampling flag 608, number of frame slips 610 and resampling period 612. The resample registers 604 are stored in memory accessible by both the RS 500 and the jitter buffer control logic 300.

In order to properly resample the decoded PCM data with minimal distortion, the jitter buffer control logic 300 computes a clock rate offset estimate 502. The clock rate offset estimate 502 is forwarded by the jitter buffer control logic 300 to the RS 500. The clock rate estimate 502 is determined based on the difference between the timestamp stored in the header of a data packet received from the packet network 110 and the local clock source 118a. If the clock rate offset estimate 502 is accurately estimated, then the maximal time duration in which to dissipate the slip event can be determined in order to achieve the minimum slip rate. Since exact estimation of the clock rate offset estimate 502 is typically difficult, this time duration is reduced by a correction factor to compensate for any estimation error.

The jitter buffer control logic 300 computes the resampling period 612 by counting the total number of frames received by the RS 500 in number of frames received 606 and accumulating the total number of frame slips received by the RS 500 in number of frame slips 610. The total number of frame slips 610 is incremented when the resampling flag 608 is set to SLIP INTERPOLATE (+1) and decremented when the resampling flag 608 is set to SLIP_DECIMATE (−1). The accumulation of the number of frame slips 610 has the effect of averaging the number of slips over time. The resampling period 612 is computed by dividing the number of frames received 606 by the number of frame slips 610 to yield the rate at which to resample the data.

The resampling performed by the RS 500 is dependent upon whether decimation or interpolation is required. The size of the resampling buffer 600 is selected in order to accommodate both the most recent voice frame and the periodic frame that arrives due to the clock rate offset estimate 502. Thus, the size of the resampling buffer 600 is fixed at twice the length of the frame. In normal mode of operation, the frame written into the resampling buffer 600 is sent unaltered to the PCM interface 200.

If the resampling Flag 608 is set to SLIP_DECIMATE. The resampling buffer 600 is filled to capacity and samples from the resampling buffer 600 are discarded at the resampling rate dependent on the resampling period 612, until the data stored in the resampling buffer 600 is depleted.

To minimize the risk of underestimation of the resampling rate, a rate factor of 2 is applied to the resampling rate to increase the resampling rate. By increasing the resampling rate, the risk of losing data if another frame arrives during the resampling period is reduced.

ECAN is off during modem/fax pass-through.

Data is interpolated while the resampling flag 608 is set to NO_SLIP (0). Data is interpolated using a simple 2-tap filter at the desired resampling rate. Samples are interpolated into the resampling buffer 600 prior to the resampling flag 608 being set to SLIP_INTERPOLATE. If a frame slip is required, the resampling flag 608 is set to SLIP_INTERPOLATE. If the jitter buffer control logic 300 indicates no data is available, the next available frame of data is sent to the PCM interface 200. At this point, no data is left in the resampling buffer 600.

To minimize the risk of using an inaccurate resampling rate if the resampling buffer 600 is not filled prior to the resampling flag being set to SLIP_INTERPOLATE, the interpolation can be performed at a rate which is twice the estimated interpolation rate.

The maximum slip event rate corresponds to how quickly a slip event is dissipated before the next slip event occurs. The maximum slip event is the length in samples of a frame stored in the resampling buffer 600. For example, if there are 40 sample frames to dissipate, the maximum slip event is a single slip event for every 40 frames received. If there is more than one slip event per 40 frames, the resampling buffer 600 will be overwritten and a modem connection can not be maintained.

The RS 500 reduces the number of modem retrains and/or speed shifts of client modems in which the echo canceller does not operate on a per sample basis. However, if a sample is sporadically dropped or added in an ECAN which operates on a per sample basis, the modem has to retrain and this reduces the data throughput of the modem. Thus, continuous phase resampling is not beneficial to a modem whose echo canceller operates on a per sample basis such as V.90.

Figure 7:
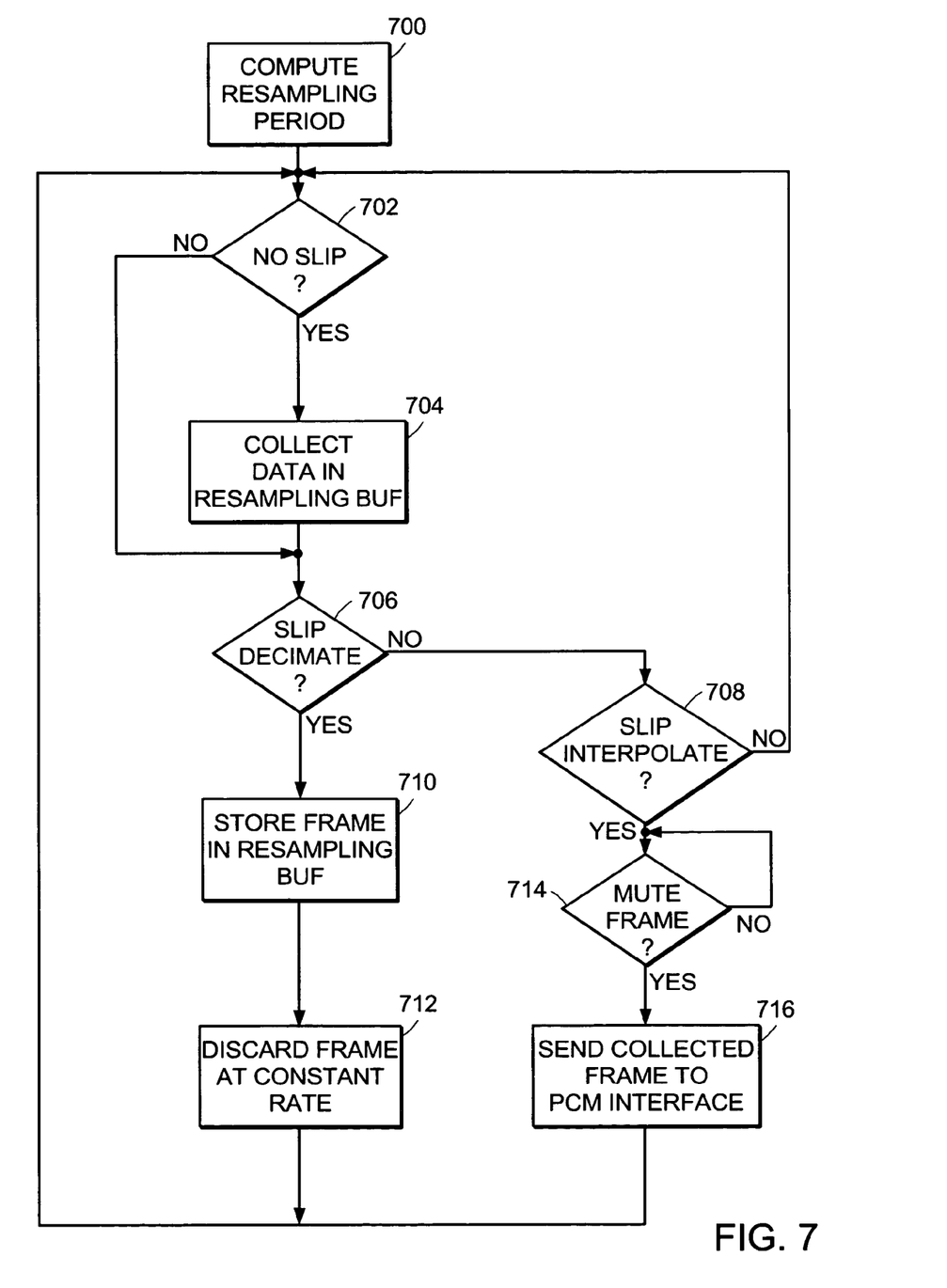
FIG. 7 is a flow chart illustrating a method for resampling implemented in the continuous phase resampling mechanism shown in FIG. 6.

FIG. 7 is a flow chart illustrating a method for resampling implemented in the continuous phase resampling mechanism shown in FIG. 6.

At step 700, the RS 500 computes the resampling period 612 by dividing the number of frames received 606 by the number of frame slips 610 to yield the rate at which to resample the data. Processing continues with step 702.

At step 702, the RS 500 examines the state of the resampling flag 608. If the state is set to NO_SLIP, processing continues with step 704. If not, processing continues with step 706.

At step 704, the resampling flag 608 is set to NO_SLIP. Thus, a slip forward or backward has not been detected. The RS 500 prepares for a slip forward by collecting samples of data in the resampling buffer 600. The data is collected by interpolating data with a two-tap filter at a specified rate. Processing continues with step 706.

At step 706, the RS 500 examines the state of the resampling flag 608. If the state is set to SLIP_DECIMATE, processing continues with step 710. If not, processing continues with step 708.

At step 708, the RS 500 examines the state of the resampling flag 608. If the state is set to SLIP INTERPOLATE, processing continues with step 714. If not, processing continues with step 702.

At step 710, the resampling flag 608 is set to SLIP_DECIMATE. Thus a slip backward has been detected. The frame is written to the resampling buffer 600. Processing continues with step 712.

At step 712, the RS 500 discards a sample from the frame. The samples are discarded at a constant rate until the entire frame has been discarded. Processing continues with step 702.

At step 714, the RS 500 waits for detection of a mute frame by the jitter buffer. Upon detection of a mute frame, processing continues with step 716.

At step 716, the RS 500 forwards the collected frame stored in the resampling buffer 600 to the PCM interface 200. Processing continues with step 702.

The invention has been described for modem traffic. However, it is also applicable to fax traffic or any other non-voice traffic transmitted over a packet network.

It will be apparent to those of ordinary skill in the art that methods involved in the present invention may be embodied in a computer program product that includes a computer usable medium. For example, such a computer usable medium may consist of a read only memory device, such as a CD ROM disk or conventional ROM devices, or a random access memory, such as a hard drive device or a computer diskette, having a computer readable program code stored thereon.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for compensating for asynchronous clock sources comprising the steps of:
   storing frames received from a packet network in a buffer;
   after a preselected playout time delay, playing the received frames from the buffer at a constant rate dependent on a local clock source;
   upon detecting a buffer overflow, performing a drain operation on the buffer and decreasing the playout delay without changing the constant rate to provide a sufficient number of buffer locations for frames to be stored;
   upon detecting a buffer underflow, performing a fill operation on the buffer and increasing the playout delay without changing the constant rate to provide a sufficient number of frames to be played out;
   storing, in a resampling buffer, data forwarded from the buffer;
   monitoring an estimated clock difference between the asynchronous clock sources; and
   performing a clock slip operation in the resampling buffer dependent on the estimated clock difference, wherein the estimated clock difference is a frame slip forward and the clock slip operation decimates the frame stored in the resampling buffer at a clock rate dependent on the estimated clock difference.

2. The method as claimed in claim 1 wherein the data stored in the buffer is modem data.

3. The method as claimed in claim 1 wherein the data stored in the buffer is fax data.

4. The method as claimed in claim 1 wherein, frames are received from the packet network at a rate dependent on a remote clock source.

5. The method as claimed in claim 1, wherein performing a drain operation comprises:
   enabling reading of the buffer and disabling writing of the buffer until the buffer is empty.

6. The method as claimed in claim 1, wherein performing a fill operation comprises:
   enabling writing to the buffer and disabling reading from the buffer until the buffer is full.

7. An apparatus for compensating for asynchronous clock sources in a modem pass-through comprising:
   a buffer which stores frames received from a packet network, the buffer playing out the received frames from the buffer at a constant rate dependent on a local clock source after a preselected playout time delay;
   upon detecting a buffer overflow, means for performing a drain operation on the buffer and decreasing the playout delay without changing the constant rate to provide a sufficient number of buffer locations for frames to be stored;
   upon detecting a buffer underflow, means for performing a fill operation on the buffer and increasing the playout delay without changing the constant rate to provide a sufficient number of frames to be played out;
   a resampling buffer which stores data forwarded from the buffer;
   means for monitoring an estimated clock difference between the asynchronous clock sources; and
   means for performing a clock slip operation in the resampling buffer dependent on the estimated clock difference, wherein the estimated clock difference is a frame slip forward and the clock slip operation decimates the frame stored in the resampling buffer at a clock rate dependent on the estimated clock difference.

8. The apparatus as claimed in claim 7 wherein the data stored in the buffer is modem data.

9. The apparatus as claimed in claim 7 wherein the data stored in the buffer is fax data.

10. An apparatus for compensating for asynchronous clock sources in a modem pass-through comprising:
    a buffer for storing frames received from a packet network, the buffer playing out the received frames from the buffer at a constant rate dependent on a local clock source after a preselected playout time delay;
    jitter buffer control logic which upon detecting a buffer overflow performs a drain operation on the buffer and decreases the playout delay without changing the constant rate to provide a sufficient number of buffer locations for frames to be stored and upon detecting a buffer underflow performs a fill operation on the buffer and increases the playout delay without changing the constant rate to provide a sufficient number of frames to be played out;
    a resampling buffer for storing data forwarded from the buffer;
    monitoring logic which monitors an estimated clock difference between the asynchronous clock sources; and
    resampling control logic which performs a clock slip operation in the resampling buffer dependent on the estimated clock difference, wherein the estimated clock difference is a frame slip forward and the clock slip operation decimates the frame stored in the resampling buffer at a clock rate dependent on the estimated clock difference.

11. The apparatus as claimed in claim 10 wherein the data stored in the buffer is modem data.

12. The apparatus as claimed in claim 10 wherein the data stored in the buffer is fax data.

13. A computer program product, for compensating for asynchronous clock sources in a modem pass-through, the computer program product comprising a computer usable medium having computer readable program code thereon, including program code which:
   stores frames received from a packet network in a buffer;
   plays out the received frames from the buffer at a constant rate dependent on a local clock source after a preselected playout time delay;
   upon detecting a buffer overflow, performs a drain operation on the buffer and decreases the playout delay to provide a sufficient number of buffer locations for frames to be stored;
   upon detecting a buffer underflow, performs a fill operation on the buffer and increases the playout delay to provide a sufficient number of frames to be played out;
   stores, in a resampling buffer, data forwarded from the buffer;
   monitors an estimated clock difference between the asynchronous clock sources; and
   performs a clock slip operation in the resampling buffer dependent on the estimated clock difference, wherein the estimated clock difference is a frame slip forward and the clock slip operation decimates the frame stored in the resampling buffer at a clock rate dependent on the estimated clock difference.

14. A computer program product, for compensating for asynchronous clock sources in a modem pass-through, the computer program product comprising a computer usable medium having computer readable program code thereon, including program code which:
   stores frames received from a packet network in a buffer;
   plays out the received frames from the buffer at a constant rate dependent on a local clock source after a preselected playout time delay;
   upon detecting a buffer overflow, performs a drain operation on the buffer and decreases the playout delay to provide a sufficient number of buffer locations for frames to be stored;
   upon detecting a buffer underflow, performs a fill operation on the buffer and increases the playout delay to provide a sufficient number of frames to be played out;
   stores, in a resampling buffer, data forwarded from the buffer;
   monitors an estimated clock difference between the asynchronous clock sources; and
   performs a clock slip operation in the resampling buffer dependent on the estimated clock difference, wherein the estimated clock difference is a frame slip backward and the clock slip operation forwards a frame stored in the resampling buffer which has been interpolated at a clock rate dependent on the estimated clock difference.

15. A method for compensating for asynchronous clock sources comprising the steps of:
   storing frames received from a packet network in a buffer;
   after a preselected playout time delay, playing the received frames from the buffer at a constant rate dependent on a local clock source;
   upon detecting a buffer overflow, performing a drain operation on the buffer and decreasing the playout delay without changing the constant rate to provide a sufficient number of buffer locations for frames to be stored;
   upon detecting a buffer underflow, performing a fill operation on the buffer and increasing the playout delay without changing the constant rate to provide a sufficient number of frames to be played out;
   storing, in a resampling buffer, data forwarded from the buffer;
   monitoring an estimated clock difference between the asynchronous clock sources; and
   performing a clock slip operation in the resampling buffer dependent on the estimated clock difference, wherein the estimated clock difference is a frame slip backward and the clock slip operation forwards a frame stored in the resampling buffer which has been interpolated at a clock rate dependent on the estimated clock difference.

16. The method as claimed in claim 15 wherein the data stored in the buffer is modem data.

17. The method as claimed in claim 15 wherein the data stored in the buffer is fax data.

18. The method as claimed in claim 15 wherein, frames are received from the packet network at a rate dependent on a remote clock source.

19. The method as claimed in claim 15, wherein performing a drain operation comprises:
   enabling reading of the buffer and disabling writing of the buffer until the buffer is empty.

20. The method as claimed in claim 15, wherein performing a fill operation comprises:
   enabling writing to the buffer and disabling reading from the buffer until the buffer is full.

21. An apparatus for compensating for asynchronous clock sources in a modem pass-through comprising:
   a buffer which stores frames received from a packet network, the buffer playing out the received frames from the buffer at a constant rate dependent on a local clock source after a preselected playout time delay;
   upon detecting a buffer overflow, means for performing a drain operation on the buffer and decreasing the playout delay without changing the constant rate to provide a sufficient number of buffer locations for frames to be stored;
   upon detecting a buffer underflow, means for performing a fill operation on the buffer and increasing the playout delay without changing the constant rate to provide a sufficient number of frames to be played out;
   a resampling buffer which stores data forwarded from the buffer;
   means for monitoring an estimated clock difference between the asynchronous clock sources; and
   means for performing a clock slip operation in the resampling buffer dependent on the estimated clock difference, wherein the estimated clock difference is a frame slip backward and the clock slip operation forwards a frame stored in the resampling buffer which has been interpolated at a clock rate dependent on the estimated clock difference.

22. The apparatus as claimed in claim 21 wherein the data stored in the buffer is modem data.

23. The apparatus as claimed in claim 21 wherein the data stored in the buffer is fax data.

24. An apparatus for compensating for asynchronous clock sources in a modem pass-through comprising:
   a buffer for storing frames received from a packet network, the buffer playing out the received frames from the buffer at a constant rate dependent on a local clock source after a preselected playout time delay;
   jitter buffer control logic which upon detecting a buffer overflow performs a drain operation on the buffer and decreases the playout delay without changing the constant rate to provide a sufficient number of buffer locations for frames to be stored and upon detecting a buffer underflow performs a fill operation on the buffer and increases the playout delay without changing the constant rate to provide a sufficient number of frames to be played out;

a resampling buffer for storing data forwarded from the buffer;

monitoring logic which monitors an estimated clock difference between the asynchronous clock sources; and resampling control logic which performs a clock slip operation in the resampling buffer dependent on the estimated clock difference, wherein the estimated clock difference is a frame slip backward and the clock slip operation forwards a frame stored in the resampling buffer which has been interpolated at a clock rate dependent on the estimated clock difference.

25. The apparatus as claimed in claim 24 wherein the data stored in the buffer is modem data.

26. The apparatus as claimed in claim 24 wherein the data stored in the buffer is fax data.

* * * * *